(12) United States Patent
Baba

(10) Patent No.: US 6,320,912 B1
(45) Date of Patent: Nov. 20, 2001

(54) DIGITAL MODULATOR

(75) Inventor: Satoshi Baba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/123,044

(22) Filed: Jul. 27, 1998

(30) Foreign Application Priority Data

Jul. 30, 1997 (JP) .................................................. 9-204501

(51) Int. Cl.⁷ ...................................................... H04L 5/12
(52) U.S. Cl. .................... 375/264; 375/278; 375/285; 332/104; 332/107; 332/123
(58) Field of Search .................... 375/264, 278, 375/285, 286, 296; 370/358, 360; 455/63, 68; 332/104, 107, 123, 126, 159

(56) References Cited

U.S. PATENT DOCUMENTS

| | | | |
|---|---|---|---|
| 5,745,049 | * 4/1998 | Akiyama et al. | 340/870.17 |
| 6,181,494 | * 1/2001 | Fujiwara | 360/46 |
| 6,201,837 | * 3/2001 | Okamoto | 375/316 |

FOREIGN PATENT DOCUMENTS

| | | | |
|---|---|---|---|
| 0895363 A | * 2/1999 | (EP) | . |
| 64-77324 | 3/1989 | (JP) | . |
| 11-146026 | * 5/1999 | (JP) | . |

* cited by examiner

Primary Examiner—Mohammad H. Ghayour
(74) Attorney, Agent, or Firm—Ostrolenk, Faber, Gerb & Soffen, LLP

(57) ABSTRACT

There is disclosed a digital modulator whose modulation parameter can be controlled and in which modulation data or modulated signals are prevented from generating interference signals with adjoining circuits through control when power supply is turned on or system is changed. The digital modulator has a device for detecting that the power supply is turned on, and the transmission data is modulated with fixed data in response to an output of the detecting device for a time required for completing a required system constitution setting. The digital modulator also has a device for detecting the presence of the control for changing the system after the power supply is turned on. In response to an output of the detecting device, modulation is performed with the fixed data for a time from the start till the completion of the setting with a predetermined time added thereto.

21 Claims, 7 Drawing Sheets

DIGITAL MODULATOR

BACKGROUND OF THE INVENTION (i) Field of the Invention

The present invention relates to a digital modulator for use in a multi-level quadrature amplitude modulation (QAM) type digital radio communication system, especially to a digital modulator which can automatically set a modulation parameter suitable for a change of a system transmission parameter based on a control signal from the outside.

(ii) Description of the Related Art

A modulator whose modulation parameter is controlled at the time of malfunction or operation is heretofore known. For example, in a known technique, outside control data including the modulation parameter is entered into a modulator and controlled in a software manner. Examples of the outside control data include control data concerning the bit number of two orthogonal data strings or a cut-off frequency of a waveform shaping filter. In accordance with the control data an orthogonal data modulating section of the modulator and the operation frequency of the waveform shaping filter are controlled to automatically change the modulation parameter.

In the prior art described above, the control data is transmitted to the modulator in a software manner when the modulation parameter is changed. Here, when power supply is turned on in the modulator, the control data is set after modulator operation is stabilized. In a transient state from the turning on of the power supply till the setting of the control data, the modulator operation becomes unstable in some case. Furthermore, even when the control data is entered, in a transient state in which the previous modulation parameter is shifted to a new modulation parameter, the modulator operation becomes unstable in some case. In the transient states, if an output spectrum of the modulator is spread beyond a required band which is determined in the system, other adjoining circuits are disadvantageously interfered with. The problem will be described in detail with reference to the drawings.

FIG. 7 shows an RF spectrum waveform when an output frequency of a digital modulator is converted to an RF frequency. The spectrum waveform shown by a solid line in FIG. 7 represents a modulation spectrum for obtaining required characteristics. Its central frequency is represented by $f_0$, and its bandwidth is represented by $f_r$. Channels adjoining the modulation spectrum are shown by dotted lines, and a central frequency of each of the channels is apart by $\pm f_r$ from the central frequency $f_0$.

When malfunction occurs immediately after the power supply turns on, and incorrect data with a double bandwidth is set, then the bandwidth with the central frequency $f_0$ is spread to $2f_r$. As a result, the modulation spectrum becomes an interference signal with the adjoining channels.

To solve the aforementioned problem of interference with the adjoining channels, for example, a system is disclosed in Japanese Patent Application Laid-open No. 77324/1989 in which adjoining circuits are prevented from being interfered with by lowering an output of a power amplifier. However, in the method, since the output is lowered, an input level of a next-stage transmission device is lowered and an apparatus failure alarm (ALM) is therefore generated. Furthermore, in a next-stage transmitter ALC circuit, full gain is provided. Therefore, the interference with the other adjoining circuits cannot be solved yet.

SUMMARY OF THE INVENTION

Wherefore, an object of the invention is to provide a digital modulator whose modulation parameters can be controlled in which modulation data or modulation signals are prevented from interfering with other adjoining circuits through control when power supply is turned on, when a system is changed or at another setting transient time.

To attain this and other objects, the invention provides a digital modulator which has a function of outside control of a modulation parameter and which comprises switching means for modulation with fixed data instead of transmission data for a predetermined time when power supply of the digital modulator is turned on or when a signal for the outside control is detected.

Furthermore, the switching means is provided with a power-on detecting circuit for detecting that the power supply of the digital modulator is turned on, a control signal latch circuit for detecting that a control signal for controlling the modulation parameter is entered, an AND circuit for detecting that an output of the power-on detecting circuit or the control signal latch circuit is generated, a timer circuit for delaying an output of the AND circuit by a predetermined time and a switch for switching the fixed data and the transmission data based on an output of the timer circuit when the power supply is turned on or when the modulation parameter is changed.

Another switching means is provided with a power-on detecting circuit for detecting that the power supply of the digital modulator is turned on, a control signal latch circuit for detecting that a control signal for controlling the modulation parameter is entered, an AND circuit for detecting that an output of the power-on detecting circuit or the control signal latch circuit is generated, a timer circuit for delaying an output of the AND circuit by a predetermined time and a flip-flop connected to the transmission data for outputting a held data value just before operation of the timer circuit based on an output of the timer circuit when the power supply is turned on or when the modulation parameter is changed.

Further switching means is provided with a power-on detecting circuit for detecting that the power supply of the digital modulator is turned on, a control signal latch circuit for detecting that a control signal for controlling the modulation parameter is entered, an AND circuit for detecting that an output of the power-on detecting circuit or the control signal latch circuit is generated and a timer circuit for delaying an output of the AND circuit by a predetermined time. Based on an output of the timer circuit, a D/A converter for digital-analog converting the transmission data is inhibited from sampling when the power supply is turned on or when the modulation parameter is changed.

DETAILED DESCRIPTION OF THE PREFERRED EMBODIMENTS

Embodiments of the invention will be described in detail with reference to the accompanying drawings.

Figure 1:
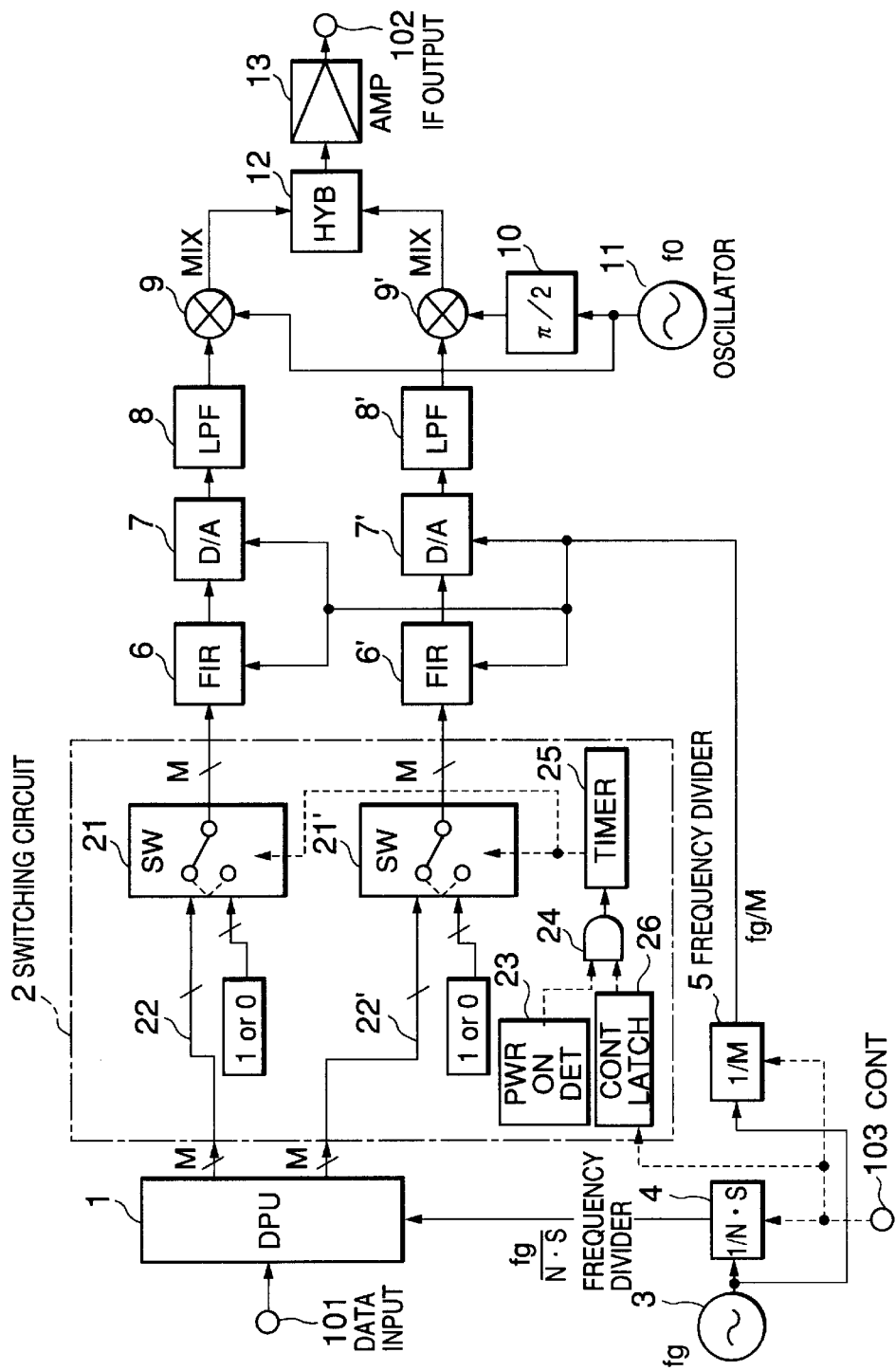
FIG. 1 is a block diagram of a digital modulator according to the invention.

FIG. 1 is a block diagram of a digital modulator according to the invention.

A signal entered via a data input 101 is digital-processed by a digital signal processor (DPU) 1 to obtain two orthogonal strings of parallel M-bit data signals. Here, M denotes a natural number of one or more. Subsequently, outputs are passed through a switching circuit (SEL) 2, waveform shaping filters (FIR) 6, 6', digital-analog converters (D/A) 7, 7', low-pass filters (LPF) 8, 8' and multipliers (MIX) 9, 9', synthesized in a synthesizer (HYB) 12, then amplified to required levels in an amplifier (AMP) 13 and modulated with a carrier frequency $f_0$ to obtain an IF-band signal in an IF output 102.

The digital modulator of the invention also serves as a $2^{2M}$-degree quadrature amplitude modulator. The MIX 9 and 9' receive an output of an oscillator (f0) 11 for oscillating the carrier frequency $f_0$ and an output of a phase shifter 10 for shifting the output phase by 90°, respectively.

Supply of a clock signal will be described. In the invention, a reference oscillator (frequency: fg) 3 is an original clock signal source. The frequency is divided to frequencies (fg/(N•S)) suitable for a required system by a frequency divider (1/(N•S)) 4 before supplied to DPU 1. The frequency is also divided to frequencies (fg/M) by a frequency divider (1/M) 5. The divided-frequency clocks (fg/M) are transmitted to FIR 6, 6' and D/A 7, 7'. Since FIR and D/A are operated through S-times over-sampling in the $2^{2M}$-degree modulation system, the frequency is divided to (S/M) times as a result. Here, S denotes a sampling number and S=1,2,4,8, . . . .

In the digital modulator, the degree of modulation system and the frequency of clock signal (fg/(S×N)) are controlled in accordance with a required transmission capacity and a working frequency. As the case may be, the change of a roll-off ratio or the like is performed by controlling the coefficient of the waveform shaping filter (FIR).

Specifically, in the digital signal processor (DPU) 1 the bit number M of output strings is changed by controlling N or S of the frequency divider (1/(N•S)) 4. Additionally, the coefficients of the waveform shaping filters (FIR) 6 and 6' are controlled by controlling and changing M of the frequency divider (1/M) 5.

Moreover, the sampling number S is controlled to reduce a higher harmonic component output without changing the characteristics of the low-pass filters (LPF) 8 and 8' for each system.

As aforementioned, the integers M, N and S are used as the modulation parameters which are the degree of modulation system, a data speed of modulation data and the coefficient of the wave shaping filter.

For example, it is supposed that transmission data with a transmission amount of ¼ (N=4) relative to the maximum transmission amount fg(bps) is transmitted as the transmission data entered via the data input for one sampling (S=1) by using the modulation system of 4 PSK (M=1). In this case, the data of fg/4 bps and the clock signal of fg/4×1 Hz from the frequency divider 4 are transmitted to DPU 1. The DPU1 divides fg/4 bps into two strings, which are transmitted to SW 21 and 21', respectively. The signals are passed through FIR 6 and D/A 7. After the waveform shaping and analog conversion, an out-of-band higher harmonic component is reduced in LPF 8, and the signal is modulated to the carrier frequency $f_0$. Finally, a modulated signal with the carrier frequency $f_0$ is outputted in the bandwidth of fg/8.

As aforementioned, in a case where the transmission capacity of the circuit can be increased without replacing the hardware of the modulator or in a case where a generalized modulator is used in various systems irrespective of the transmission capacity and the modulation system, the parameters S, M and N are controlled in response to a control signal (CONT) 103.

The setting is controlled by the control signal (CONT) 103 from a controller (not shown) for controlling the entire system when the power supply is turned on and the system is changed.

The digital modulator of the invention also has a power-on detecting circuit (PWR ON DET) 23 for detecting that the power supply is turned on and sending a detection signal; an AND circuit (AND) 24 for switching data to fixed data or data transmitted from DPU 1 after an optional time elapses after either an output of the power-on detecting circuit 23 or the control signal 103 outputted at the time of setting change is generated; a timer circuit (TIMER) 25; and the switches (SW) 21 and 21'. In the constitution, when the power supply is turned on or the system is changed or at another transient time, the fixed data is first entered, and the data is switched to the data to be transmitted after the optionally set time elapses.

Additionally, the fixed data are set to digital bit patterns which provide a modulation average output level at a multi-level quadrature amplitude modulation, the output level. As a result, the modulation output level varies only a little when the power supply is turned on or the outside control is performed.

Operation of the digital modulator shown in the block diagram of FIG. 1 will be described with reference to FIGS. 2 and 3.

Figure 2:
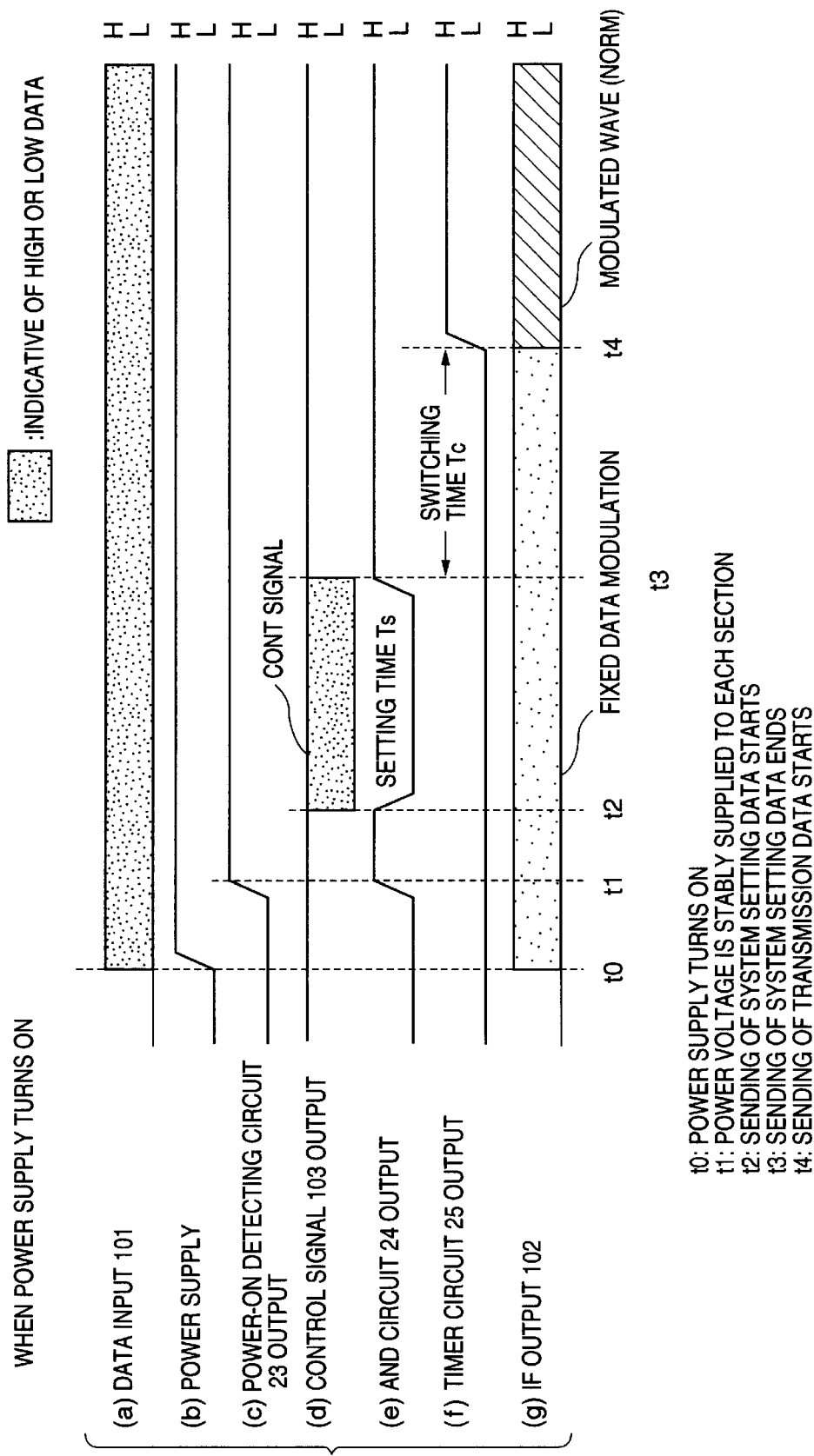
FIG. 2 is a time chart showing operation when power supply is turned on in FIG. 1.
Figure 3:
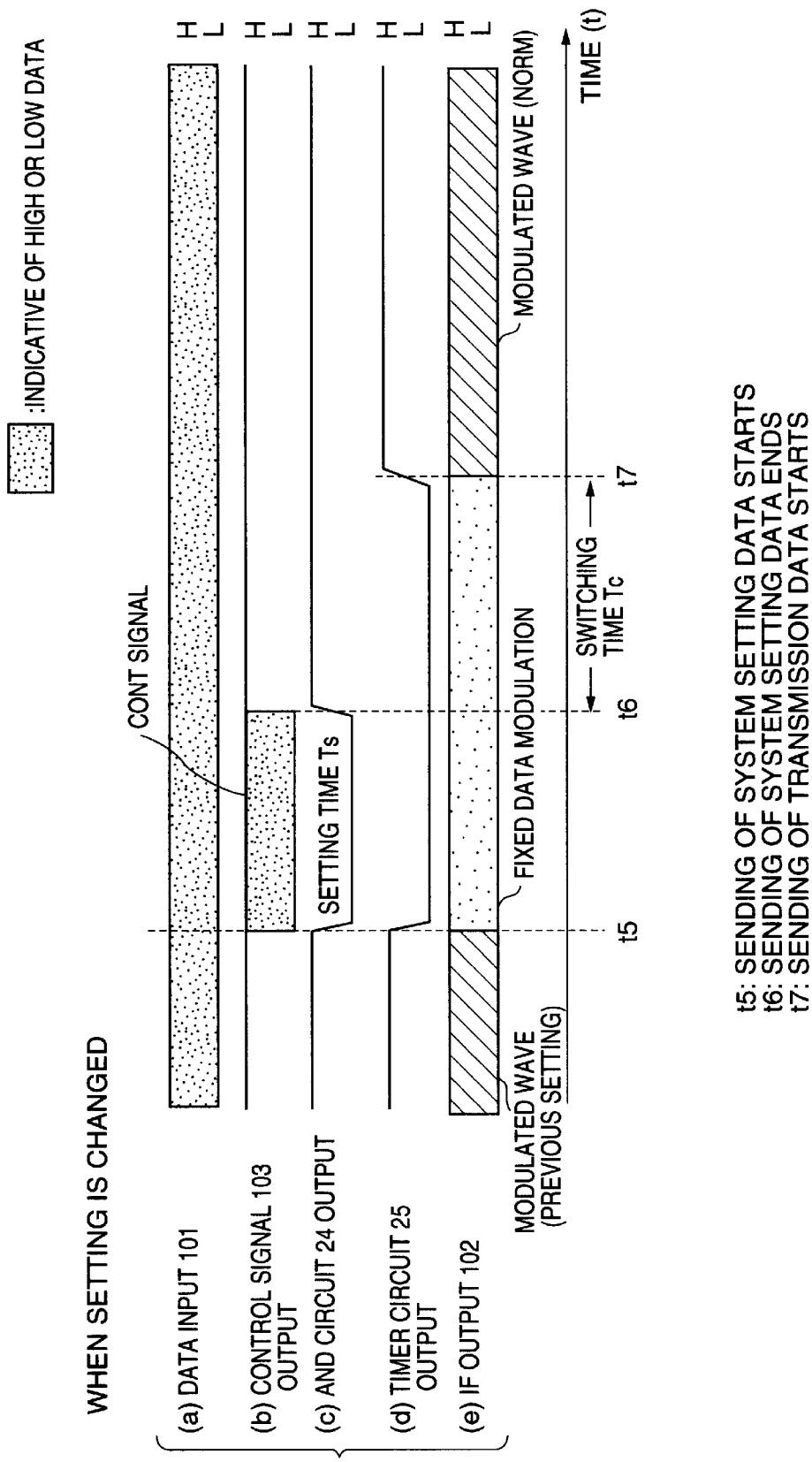
FIG. 3 is a time chart showing operation when setting is changed in FIG. 1.

FIG. 2 shows a waveform of each section when the power supply is turned on.

As aforementioned, when the power supply of the digital modulator is turned on, in a condition where no control signal 103 is transmitted from the controller, data is generated in DPU 1 even if no input signal is entered. Therefore, a signal based on set conditions of the frequency dividers 4 and 5 are transmitted through FIR 6, 6', LPF 8, 8', MIX 9, 9', HYB 12 and AMP 13 to disadvantageously interfere with adjoining circuits.

To solve the problem, in the invention the power-on detecting circuit 23 detects at time t0 that the power supply is turned on, and emits a low-level (L) reset signal until time t1 when supply voltage is stably supplied to each section. Subsequently, a high-level (H) signal is outputted at and after the time t1 (FIG. 2(c)).

Furthermore, the control signal 103 is outputted to send system setting serial data at a certain setting time t2 (FIG. 2(d)). Here, a time (power-on time) from time t0 to time t2 is defined as a time Tp. In FIG. 2, the system setting data is sent for a setting time Ts from time t2 until t3, and the serial data is of a high level (H) at another time.

The signal is transmitted to the control signal latch circuit 26, and a low-level (L) voltage at the time of control or a high-level (H) voltage at the time of no control is generated in the output of the AND circuit 24 (FIG. 2(e)). The output of the AND circuit 24 is transmitted to the timer circuit 25, and reaches a high level (H) after time t3 elapses after the power supply is turned on. After a switching time Tc elapses, a high-level (H) output is emitted from the timer circuit 25 at time t4, and SW 21 is switched (FIG. 2(f)).

In FIG. 2(g), the fixed data is transmitted for a time Td1 as below.

$$Td1=Ts+Tc+Tp \tag{1}$$

The time of system setting change will be similarly described with reference to FIG. 3. The setting time Ts of the system setting serial data for which the setting data is transmitted via the control signal 103 to the switching circuit 2 is equal to the time (t3−t2) of FIG. 2 (FIG. 3(b)).

Additionally, system setting start time is represented by t5. In the control signal latch circuit 26, the system setting data is entered and latched, and a low-level output is emitted for the time (t3−t2). As a result, the output of the AND circuit 24 is of a low level for the time Ts from t5 until t6, and reaches a high level afterwards (FIG. 3(c)). Therefore, the output of the timer circuit 25 reaches a high level at time t7 after the switching time Tc elapses, so that SW 21 is switched.

By setting the time Tc for switching the fixed data to the transmission data in the timer circuit 25 to Tc>time(t2−t1) in consideration of the time for turning on the power supply, the modulated output can be prevented from being spread at the setting transient time.

In FIG. 3(e), the fixed data is transmitted for a time Td2 as bellow.

$$Td2=Ts+Tc \tag{2}$$

Figure 4:
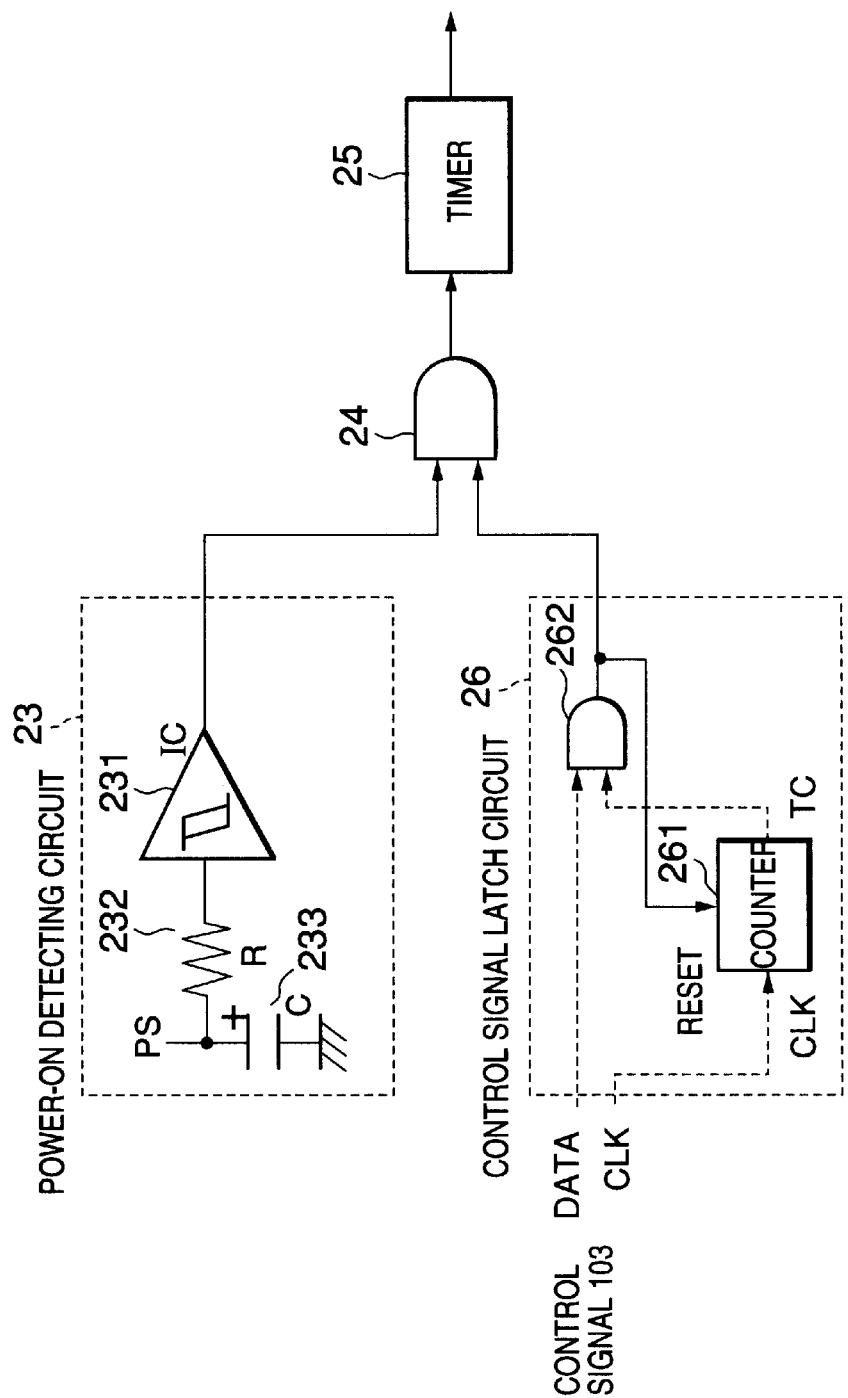
FIG. 4 is a block diagram showing a power-on detecting circuit 23 and a control signal latch circuit 26 of FIG. 1.

Constitutions of the power-on detecting circuit 23 and the control signal latch circuit 26 constituting the switching circuit 2 of FIG. 1 will be described with reference to FIG. 4.

The power-on detecting circuit 23 is provided with, for example, a capacitor (C) 233, a resistance (R) 232 and a buffer IC (IC) 231. When the power supply is turned on, an output of the buffer IC 231 is adjusted by time constants of C and R in the circuit in such a manner that the output reaches a high level after time t1 elapses. An adjustment is made in such a manner that a voltage of power supply input 'PS' is raised via a CR time constant circuit to exceed a threshold voltage of the buffer IC 231 at the time t1.

The control signal latch circuit 26 will now be described.

The control signal 103 is transmitted to the control signal latch circuit. The control signal 103 is constituted of control data and clock signals. The number of the clock signals is counted by a counter 261, and an output TC of the counter 261 is transmitted to an AND circuit 262 together with the system setting data. Furthermore, the output TC of the counter 261 is set in such a manner that a high-level output is emitted after a time required for system setting, corresponding to (t3−t2), elapses after the input of the reset signal.

When the system setting starts, the control data once reaches a low level.

When the control data is entered, the output of the AND circuit 262 in the control signal latch circuit 26 reaches a low level to turn on the counter 261. After the counter 261 counts the number of clock signals for the time (t3−t2) based on clock input, the counter emits a high-level output. At this time, the control signal data has been set and has reached a high level.

As a result, the output of the control signal latch circuit 26 is of a low level only for the system setting time (t3−t2), and transmitted to the AND circuit 24 shown in the switching circuit 2 together with the output of the power-on detecting circuit 23. The output reaches a high level after time t4 elapses after the output is transmitted to the timer circuit 25.

Figure 5:
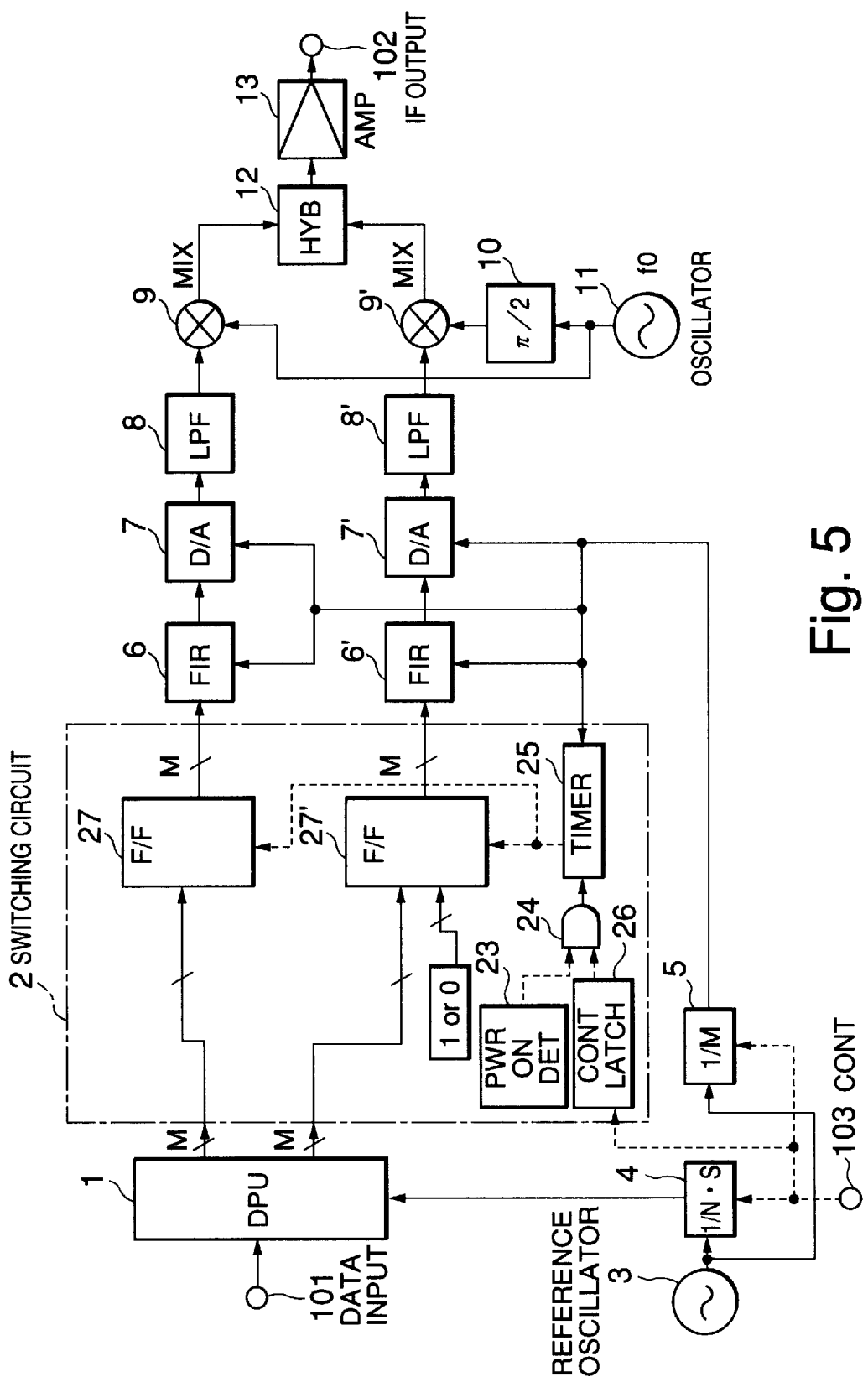
FIG. 5 is a block diagram showing a second embodiment of the digital modulator of the invention.

A second embodiment of the invention will be described with reference to the drawings. In the first embodiment shown in FIG. 1, the switch 21 is used, but the invention is not limited thereto. For example, as shown in FIG. 5, flip-flop circuits 27 and 27' can be used instead of the switches 21 and 21'. Specifically, while the timer circuit 25 is operated, the same effect as that of the first embodiment can be obtained by holding data at a data value just before the timer circuit 25 is operated.

Figure 6:
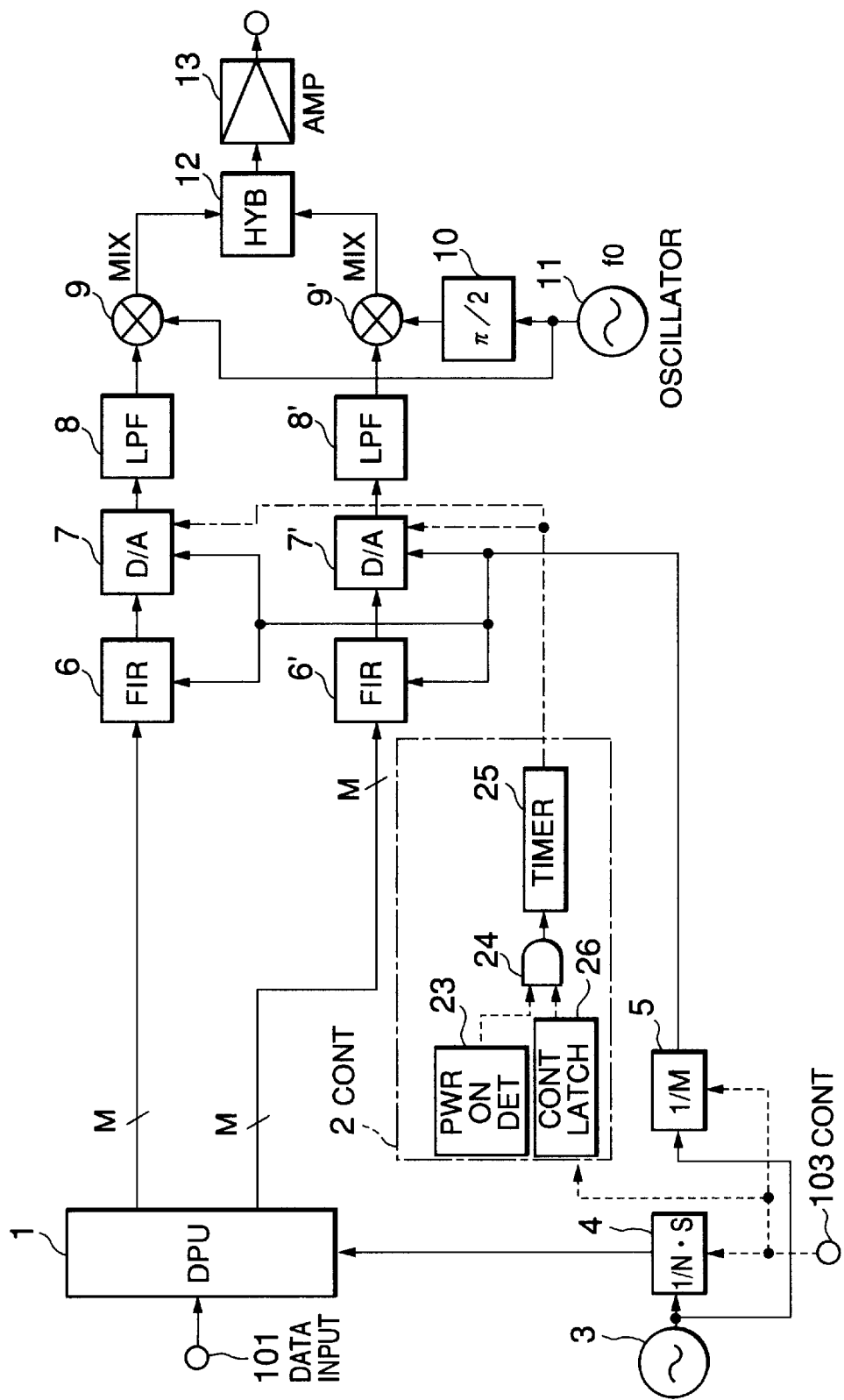
FIG. 6 is a block diagram showing a third embodiment of the digital modulator of the invention.
Figure 7:
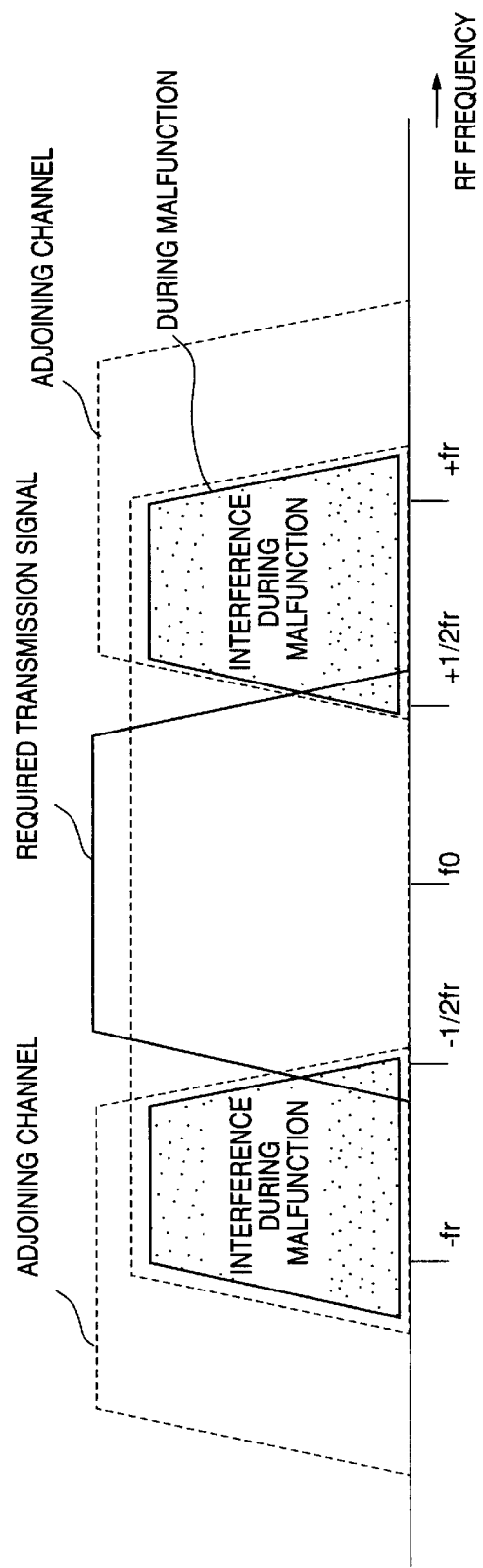
FIG. 7 is an explanatory view showing an influence of an output waveform from the digital modulator onto adjoining channels.

Furthermore, in a method according to a third embodiment, as shown in FIG. 6, the switch 21 is not used. The output of the timer circuit 25 is transmitted to reset terminals of D/A 7 and 7'1, and the sampling of D/A 7, 7' is stopped while the output of the timer circuit 25 is in a low level. Thereby, the same effect as that of the first embodiment can be obtained.

In the digital modulator of the invention, the power-on detecting means is provided for detecting that the power supply is turned on, and the transmission data is set to a fixed value for the time required for completing the system constitution setting. Therefore, by setting the fixed data for the optional time after the power supply turns on and by emitting carrier outputs until the required system constitution setting is completed, the interference with the other adjoining circuits is effectively inhibited.

Furthermore, the digital modulator of the invention has the detector for detecting the presence of the control for changing the system after the power supply turns on. Therefore, since the fixed data is set for the time from the setting start until the setting completion with a predetermined time added thereto and carrier outputs are emitted until the required system constitution setting is completed, the interference with the other adjoining circuits can be effectively suppressed even when the system is changed.

Moreover, in the invention, in order to make the carrier output level at the setting transient time equal to that at the usual time, the fixed data can be defined. Therefore, since a method of lowering the output of the power amplifier is not used different from the conventional system, the alarm about level decrease of the transmission device is prevented from being generated by output decrease. Alternatively, the interference with other adjoining circuits can be effectively prevented from being caused by the full gain of the transmitter ALC circuit.

What is claimed is:

1. A digital modulator for modulating transmission data in a required band, comprising:
    means for outside control of a modulation parameter; and
    switching means for modulation with fixed data instead of said transmission data only for a predetermined time when turning on of a power supply of said digital modulator is detected or when a signal for said outside control is detected.

2. The digital modulator according to claim 1 wherein said predetermined time is a time which is obtained by adding a setting time (Ts) of said modulation parameter, a switching time (Tc) of said switching means and a power-on time (Tp) when said turning on of the power supply is detected or a time which is obtained by adding the setting time of said modulation parameter and the switching time of said switching means when said outside control signal is detected.

3. The digital modulator according to claim 1, the switching means comprising:
    a power-on detecting circuit for detecting that the power supply of said digital modulator is turned on;

a control signal latch circuit for detecting that a control signal for controlling the modulation parameter is entered;

an AND circuit for detecting that an output of either said power-on detecting circuit or said control signal latch circuit is generated;

a timer circuit for delaying an output of said AND circuit by a predetermined time; and a switch for switching data to the fixed data or said transmission data based on an output of said timer circuit when the power supply is turned on or when the modulation parameter is changed.

4. The digital modulator according to claim 1 wherein said outside control means changes the modulation parameter which is a degree of modulation system, a data speed of modulation data and coefficient of a digital filter based on a clock signal obtained by controlling the number of frequency division of a reference clock from outside.

5. The digital modulator according to claim 4 wherein said frequency division is performed by a first frequency divider for controlling a data speed of said digital modulator and a second frequency divider for controlling a coefficient of a waveform shaping filter.

6. The digital modulator according to claim 5 wherein said first frequency divider sets said frequency division number to 1/(N•S), where N=1,2,3,4 . . . and S=1,2,4,8 . . . .

7. The digital modulator according to claim 5 wherein said second frequency divider sets said frequency division number to 1/M, in which M is a positive integer.

8. The digital modulator according to claim 1 wherein digital modulator is a quadrature amplitude modulator and degree of said digital modulator is $2^{2M}$.

9. The digital modulator according to claim 1, said switching means comprising:

a power-on detecting circuit for detecting that the power supply of said digital modulator is turned on;

a control signal latch circuit for detecting that a control signal for controlling the modulation parameter is entered;

an AND circuit for detecting that an output of either said power-on detecting circuit or said control signal latch circuit is generated;

a timer circuit for delaying an output of said AND circuit by a predetermined time; and a flip-flop connected to said transmission data for outputting a held data value just before operation of said timer circuit based on an output of said timer circuit when the power supply is turned on or when the modulation parameter is changed.

10. The digital modulator according to claim 1, said switching means comprising:

a power-on detecting circuit for detecting that the power supply of said digital modulator is turned on;

a control signal latch circuit for detecting that a control signal for controlling the modulation parameter is entered;

an AND circuit for detecting that an output of either said power-on detecting circuit or said control signal latch circuit is generated;

a timer circuit for delaying an output of said AND circuit by a predetermined time; and an inhibiting circuit for stopping sampling of a D/A converter for digital-analog converting said transmission data based on an output of said timer circuit when the power supply is turned on or when the modulation parameter is changed.

11. A digital modulator for modulating transmission data in a required band, comprising:

means for outside control of a modulation parameter;

a digital signal processor for converting an input data signal to two orthogonal strings of parallel data;

a switching circuit for inputting said parallel data and fixed data for each of said strings and switching in such a manner that said fixed data is outputted instead of said parallel data only for a predetermined time when a power supply of said digital modulator is turned on or when a signal for said outside control is detected;

a waveform shaping filter for shaping a waveform of each output of said switching circuit;

a D/A converter for receiving each output of said waveform shaping filter for digital-analog conversion;

a low-pass filter for receiving each output of said D/A converter and removing a high-frequency noise;

an orthogonal modulator for orthogonally modulating each output of said low-pass filter on a carrier frequency; and an amplifier for amplifying an output of said orthogonal modulator to a predetermined output.

12. The digital modulator according to claim 11 wherein said predetermined time is a time which is obtained by adding a setting time of said modulation parameter, a switching time of said switching means and a time required for stabilizing the power supply when said turning on of the power supply is detected or a time which is obtained by adding the setting time of said modulation parameter and the switching time of said switching means when said outside control signal is detected.

13. The digital modulator according to claim 11 wherein said outside control means changes the modulation parameter which is a degree of modulation system, a data speed of modulation data and coefficient of a digital filter based on a clock signal obtained by controlling the number of frequency division of a reference clock from outside.

14. The digital modulator according to claim 11 wherein said frequency division is performed by a first frequency divider for controlling a bit number of data of said digital modulator and a second frequency divider for controlling a coefficient of the waveform shaping filter.

15. The digital modulator according to claim 14 wherein said first frequency divider sets said frequency division number to 1/(N•S) , where N=1,2,3 . . . and S=1,2,4,8 . . . .

16. The digital modulator according to claim 14 wherein said second frequency divider sets said frequency division number to 1/M, in which M is a positive integer.

17. The digital modulator according to claim 11 wherein digital modulator is a quadrature amplitude modulator and degree of said digital modulator is $2^{2M}$.

18. The digital modulator according to claim 11, said switching means comprising:

a power-on detecting circuit for detecting that the power supply of said digital modulator is turned on;

a control signal latch circuit for detecting that a control signal for controlling the modulation parameter is entered;

an AND circuit for detecting that an output of either said power-on detecting circuit or said control signal latch circuit is generated;

a timer circuit for delaying an output of said AND circuit by a predetermined time; and a flip-flop connected to said transmission data for outputting a held data value just before operation of said timer circuit based on an output of said timer circuit when the power supply is turned on or when the modulation parameter is changed.

19. The digital modulator according to claim 11, said switching means comprising:
   a power-on detecting circuit for detecting that the power supply of said digital modulator is turned on;
   a control signal latch circuit for detecting that a control signal for controlling the modulation parameter is entered;
   an AND circuit for detecting that an output of either said power-on detecting circuit or said control signal latch circuit is generated;
   a timer circuit for delaying an output of said AND circuit by a predetermined time; and
   an inhibiting circuit for stopping sampling of a D/A converter for digital-analog converting said transmission data based on an output of said timer circuit when the power supply is turned on or when the modulation parameter is changed.

20. The digital modulator according to claim 1 wherein said fixed data are set to digital bit paterns which provide a modulation average output level at a multi-level quadrature amplitude modulation.

21. The digital modulator according to claim 11 wherein said fixed data are set to digital bit paterns which provide a modulation average output level at a multi-level quadrature amplitude modulation.

* * * * *